United States Patent [19]
Lai

[11] Patent Number: 5,280,491
[45] Date of Patent: Jan. 18, 1994

[54] TWO DIMENSIONAL SCAN AMPLIFIER LASER

[76] Inventor: Shui T. Lai, 1223 Orchard Glen Cir., Encinitas, Calif. 92024

[21] Appl. No.: 740,004

[22] Filed: Aug. 2, 1991

[51] Int. Cl.$^5$ ............................................. H01S 3/10
[52] U.S. Cl. .................................... 372/24; 359/347; 372/92; 372/107
[58] Field of Search .............. 359/347, 346, 345, 348; 372/24, 92, 107

[56] References Cited

U.S. PATENT DOCUMENTS

| | | | |
|---|---|---|---|
| 3,480,875 | 11/1969 | Pole | 372/24 |
| 3,992,682 | 11/1976 | White et al. | 359/346 |
| 4,001,705 | 1/1977 | Sinclair et al. | 359/347 |
| 4,186,353 | 1/1980 | Boutineau | 359/347 |
| 4,191,928 | 3/1980 | Emmett | 359/348 |
| 4,872,181 | 10/1989 | Johnson et al. | 372/92 |
| 4,918,395 | 4/1990 | Difonzo et al. | 372/92 |

*Primary Examiner*—James W. Davie
*Attorney, Agent, or Firm*—Frank D. Gilliam

[57] ABSTRACT

The disclosure is directed to a laser amplifier system utilizing a pair of scanning mirrors driven in tandem by piezo actuators. A control provided to direct a low power laser beam while the beam is trapped and circulates between the pair of scanning mirrors. Each bounce of the laser beam between the mirrors discretely increases the power of the beam and changes the angle of exit of the beam from the amplifier providing for precise angular beam exit control in two dimensions.

46 Claims, 4 Drawing Sheets

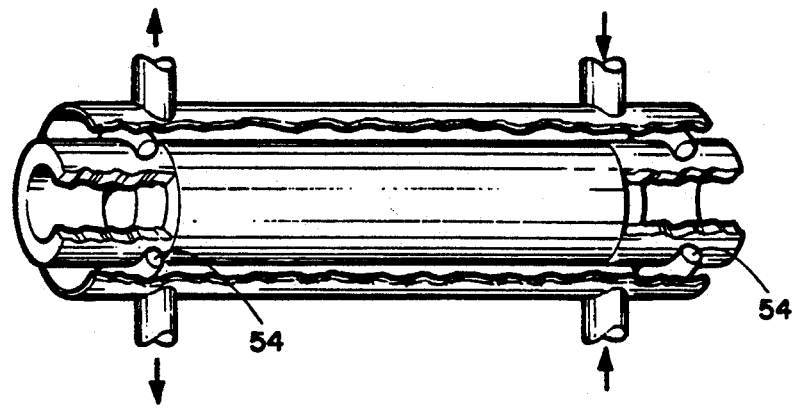
FIGURE 5(a)
FIGURE 5(b)
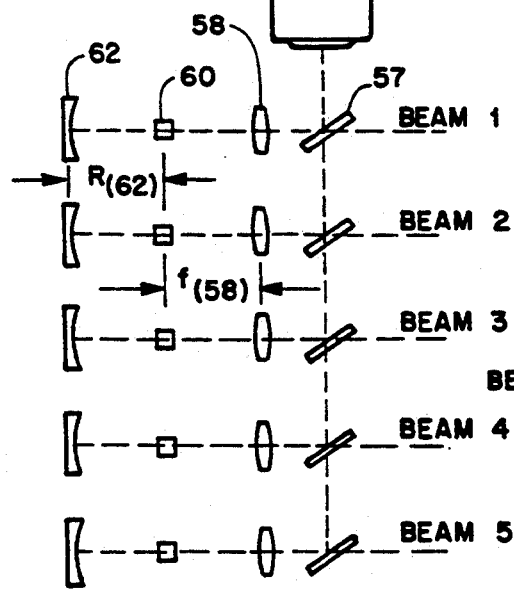
FIGURE 4(a)
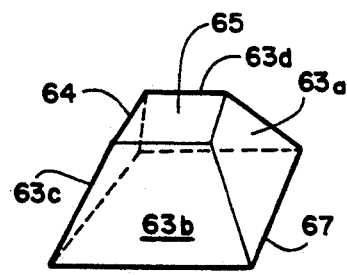
FIGURE 4(b)
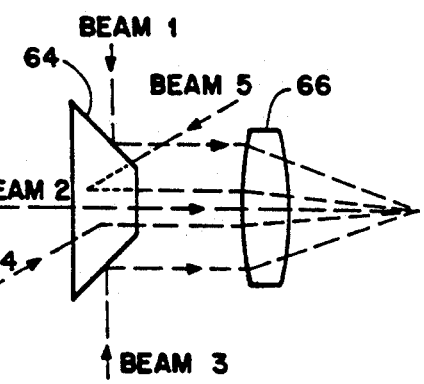
FIGURE 4(c)

TWO DIMENSIONAL SCAN AMPLIFIER LASER

BACKGROUND OF THE INVENTION

U.S. Pat. No. 3,432,771, Hardy et al., issued Mar. 11, 1969 discloses an apparatus for changing the direction of a light beam in an optical cavity. The cavity consists of a focussing objective, located between two reflectors, such as curved mirrors. The relative position of one center of curvature with the other center of curvature can be controlled by positioning of one of the mirrors. Points on the reflectors are located at the object and the image positions for the objective. When the active medium is suitably excited, the orientation of the lasing mode, and hence the position of the spots of light, is determined by the effective angular positioning of the reflectors.

U.S. Pat. No. 3,480,875, Pole, issued Nov. 25, 1969 disclosed a laser cavity which was set up between a pair of plane mirrors. At least one active laser element is located between the mirrors. A pair of lens systems are positioned between the mirrors so that they have a common focal plane between them. A Kerr cell, polarizers, and a compensator suppress light oscillation along certain reflector paths within the cavity, thereby setting up preferred modes of oscillation along other paths. Laser emission occurs along the preferred paths.

U.S. Pat. No. 3,597,695, James E. Swain, issued Aug. 3, 1971 disclosed an apparatus for amplifying laser light by multiple passes through a lasing material in a single laser cavity. A single amplifier stage achieved what has been accomplished by several stages. This is accomplished by a switching mechanic which directs a laser beam into and out of the cavity at selected time intervals, thereby enabling amplification of low intensity laser pulses to energy level near the damage limits of the optical components of the system.

U.S. Pat. No. 4,191,928, John L. Emmett, issued Mar. 4, 1980 disclosed a high energy laser system using a regenerative amplifier, which relaxes all constraints on laser components to her than the intrinsic damage level of matter, so as to enable use of available laser system components. This can be accomplished by use of segmented components, spatial filter.

"A survey of laser beam deflection techniques," by Fowler and Schlafer, Proceedings of IEEE, vol 54, no. 10, pages 1437 and 1444, 1966.

The control of laser beam positioning has become a key element in many field of applications such as image processing, graphic display, materials processing, and surgical applications involving precision tissue removal.

Many techniques have been developed for the controlling of the laser beam direction. For the purpose of this invention, this discussion will be limited to the speed, accuracy, and the scan angle range of different devices used in a random access mode.

Galvanometer mirror scanners have a large scan angle range. However, the mechanical response due to the balance of the coil and the applied magnetic field is limited to a few hundred Hertz. The settling time and the oscillation about the equilibrium point further limits the accuracy attainable with such devices.

Mirrors positionable with piezo actuators are capable of accurate hunt free movement response of up to tens of kilo-hertz, depending on the design of the mounts. The typical scan angle is in the order of few milli-radiant. Methods to enhance the scan angle has been proposes by J. Schlafer and V. J. Fowler, "A Precision, High Speed, Optical Beam Scanner," Proceedings, International Electron Devices Meeting, 1965. In their report, multiple piezo-mirrors were used to intercept the laser beam, such that the scan angle of the each scanner is contributing to the total of the effect, which is the sum of all scan angles. This device requires many individual scanner units, which multiplies in economic cost with the number of units, and the mirror size also limits the number of units to be used before the beam will miss the last mirror.

Furthermore, both of the above methods are applicable in one dimensional scanning only. For two dimensional scans, an additional unit, which is either an identical or a mix with another device must be provided for the scanning in the other dimension, doubling the cost, and space requirement.

In U.S. Pat. No. 3,480,875, R. V. Pole, has disclosed a scanning laser device, in which the spatial orientation of the laser beam in the resonant cavity is controlled by passing through a combination of a retardation plate and a Kerr cell inside the laser cavity. At a specific angle as determined by the Kerr cell, loss is minimum for the laser beam, and therefore the laser beam will oscillate in that preferred direction. While this method allow a scanning of large angles, the scan speed is limited by the laser build-up time, for which the laser beam intensity will be re-established at each new beam direction. Another drawback of this arrangement is the variation in the laser intensity, during the laser build-up.

In U.S. Pat. No. 3,432,771, W. A. Hardy, disclosed another scanning laser, in which the optical cavity consists of a focusing objective, and spherical reflectors or equivalent optics which consists of a lens and a plane mirror. The scan angle is magnified most effectively in an optical arrangement that the two end reflectors forms a nearly concentric cavity with the focusing lens at the center of focus. The drawback is the cavity is tolerant of diverging beam to build up inside the cavity as illustrated in the FIG. 1 of the patent, hence that laser output has high content of multiple transverse mode. With an increase of the radius of curvature of the scan mirror and keeping its location fixed, the multi-mode content can be reduced, but the scan range will approach that of the actual scan angle with a possible small magnification factor. As suggested by its preferred embodiment with an electro-optical beam deflector, the scan angle will be only a few milli-radiant if a near diffraction-limited laser beam is to be produced.

There has not been a successful apparatus and method to overcome the above deficiencies of the prior art until the emergence of the present invention.

SUMMARY OF THE INVENTION

An object in accordance with the present invention is to provide a scanner-amplifier unit which accepts a low energy laser pulse and emits an amplified laser pulse at a predetermined angular positions in two dimensions.

It is another object of this invention to disclose a construction of a high speed scanner-laser amplifier system, which has the capability of large scan angles, and emitting high quality, near diffraction limited laser beam. The scanner of the present invention can position a laser beam in two dimensional in a random access mode at high speed.

It is another object of the invention that the scanner-amplifier system generate ultra short laser pulses in 1-500 pico seconds duration at a multi-kilo Hertz repetition rate and the energy of each laser pulses is amplified in a controlled manner to a desired level up to the damage level of the optical components.

It is another object of the invention that the laser medium is to be pumped by plurality of laser beams in a longitudinal direction, such that high excitation density is achieved in the laser medium.

It is another object of the invention that the scanner-amplifier system can place an individual high energy laser pulse at a precisely intended angular location in a two dimensional space.

It is yet another object of this invention to construct a $Ti:Al_2O_3$ laser with high laser pulse rate, in the range of 1000 to 50,000 pulses per second, and with high average laser power, in the range of several watts or higher.

It an object of this invention that each of this laser pulse has high peak power, and a short pulse duration, of sub-pico seconds to hundreds of pico seconds.

Still another object of this invention is to generate stable and high conversion efficiency in the second harmonic laser wavelength, which is used to generate population inversion in the $Ti:Al_2O_3$ laser medium.

It is an object of this invention to provide a novel method to attain the high pump power in the second harmonic wavelength for the $Ti:Al_2O_3$ laser.

It is an object of this invention to propose a novel method to attain the high pump power in an end pumping configuration for the $Ti:Al_2O_3$ laser.

The preferred method for controlling the direction of the laser beam consists of a pair of scanning mirrors driven by piezo actuators. The mirror pair are driven in tandem. The scan angles of the mirror pair are summed and amplified by an optical arrangement. Two convergent spherical lenses of un-equal focal length are arranged between the scanning mirrors in such a way that a laser beam will be travelling inside the cavity in which the boundary is defined by the scan mirrors. For each round trip of the laser beam inside the cavity, the angle of the laser beam to an exit window increases in multiple of the actual scan angles of the scan mirrors.

In accordance with this invention, the direction of the laser beam emitted from the scanner-amplifier system is controllable in two dimensions, in high speed, and with high precision.

In a preferred embodiment, the laser beam is generated by an amplifying means with a seeding laser pulses. Optical retardation plate, Pockel cell, and polarization dependant optical elements are used for the control of a seed laser beam and directing that laser beam in the amplifier cavity. A laser gain medium is included in the cavity. Means for exciting the laser medium, and to generate multi-kilo Hertz, ultra short duration laser pulses are disclosed in the invention. Means for controlling the timing and the synchronization of the seed pulse, the pump source, and the amplified laser pulses inside the scanner-amplifier cavity are also provided.

It is an object of this embodiment to provide a means and method for combining a plurality of laser beams to provide a high power laser beam source.

It is another object of the invention to provide a combiner for combining a plurality of laser beams that does not require any form of specific polarization in any of the component beams.

It is an object of such a combiner, that it can form a beam bundle consisting of large number of beams in a small cross section.

It is yet another object of this invention to provide a novel method of combining a plurality of laser beams to provide a high power laser beam source for end pumping configuration of a laser beam.

This combiner eliminates the limitation imposed by the physical size of the beam steering optics and the optical mounts.

Earlier method of beam combining relies on the direction of the linear polarization, and this method is limited to combining two beams only.

Other advantages and features of the invention will become apparent form the following description of several embodiments thereof, shown in the attached drawings, in which:

BRIEF DESCRIPTION OF THE DRAWING FIGURES

FIG. 2b is a showing of the wave form of the Pockel cell signal voltage applied to beam as indicated on FIG. 2a;

FIG. 4a is a schematic showing of a means of generating stable second harmonic laser power;

FIG. 4b is a perspective showing of a spatial combiner for combining the plurality of pump beams of FIG. 4a;

Figure 6:
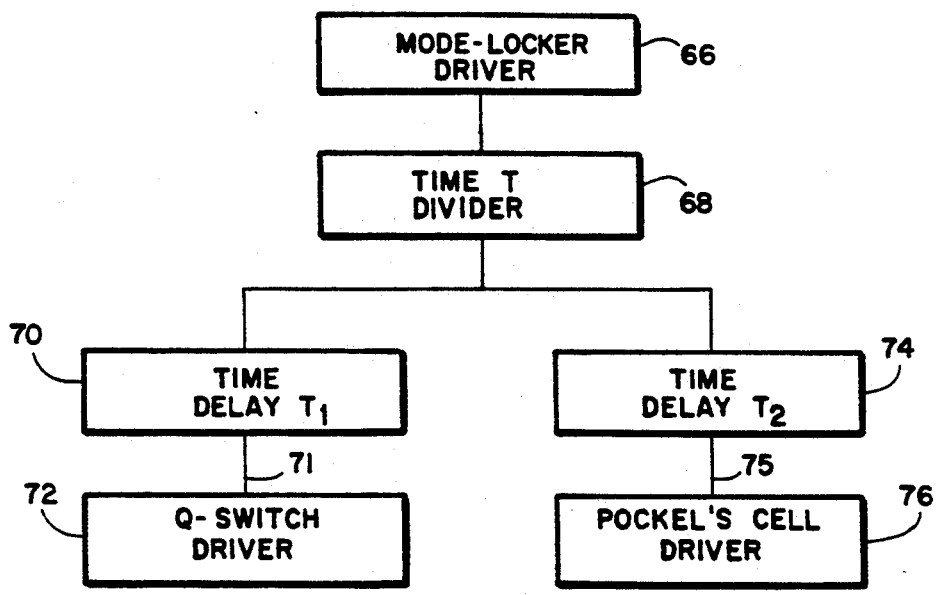
Figure 7:
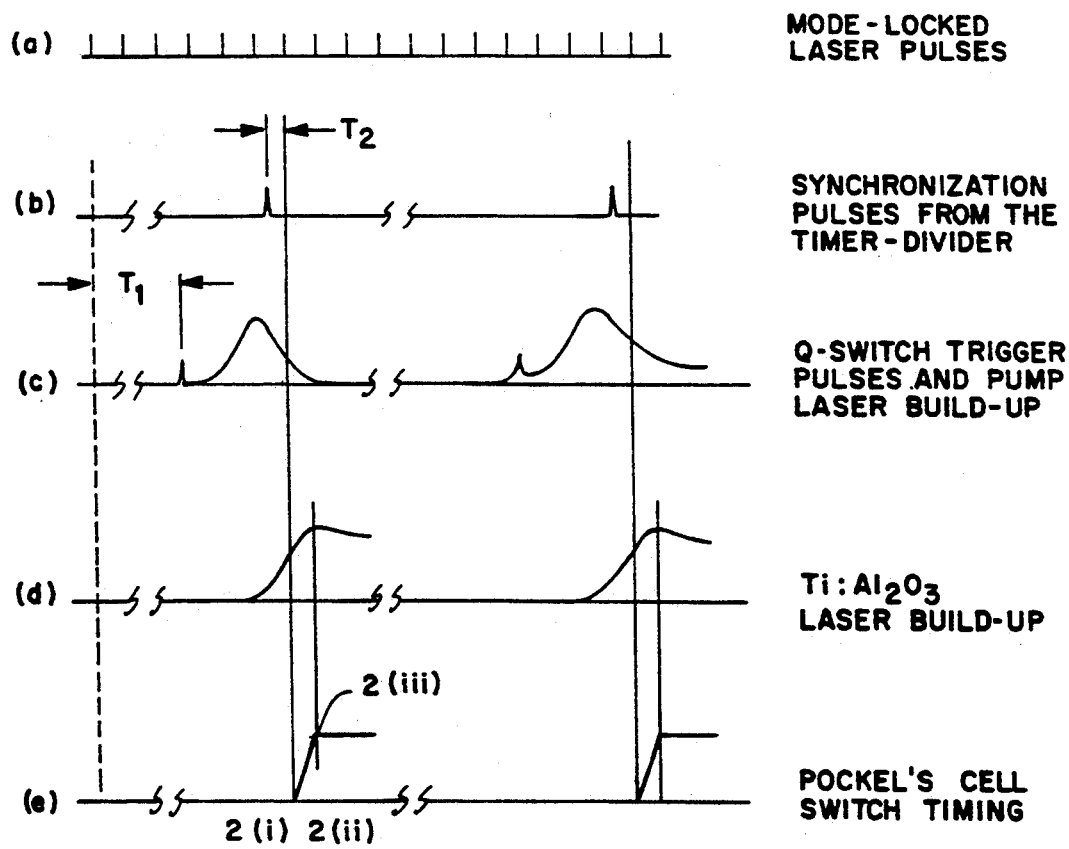

FIG. 4c schematically depicts the combining of the beams of FIG. 4a into a single second harmonic beam from the generated beam of FIG. 4a;

FIG. 5a is a perspective exploded showing of a method of mounting the laser medium;

FIG. 5b is a cutaway perspective showing of the laser medium of FIG. 5a a enclosed in a water jacket for cooling;

FIG. 6 is a block diagram showing the electrical connections between the mode-locked laser driver, the timer-divider, the Pockel's cell driver and the Q switch driver of the pump laser; and FIG. 7 is diagram showing the synchronization between the mode-locked laser pulses, the selected laser pulses after the timer-divider electric circuit, the Q switched laser pulses for pumping the gain medium and the half-wave optical switch wave form.

DETAILED DESCRIPTION OF THE PREFERRED EMBODIMENTS

In the preferred embodiment, a laser scanner-amplifier system 8 with Ti doped sapphire $Al_2O_3$ is used as the laser medium. However, the laser medium can be other tunable solid state laser materials, such as alexandrite, emerald, Cr:LiCaF, Cr:LiSrF, Cr: forsterite, color center lasers, or rare earth ions laser media, such as Nd, Pr, Er, Tm, Ho, or other transition metal ions such as Co, Ni in various solid state crystal hosts, including oxides or fluorides.

Figure 1:
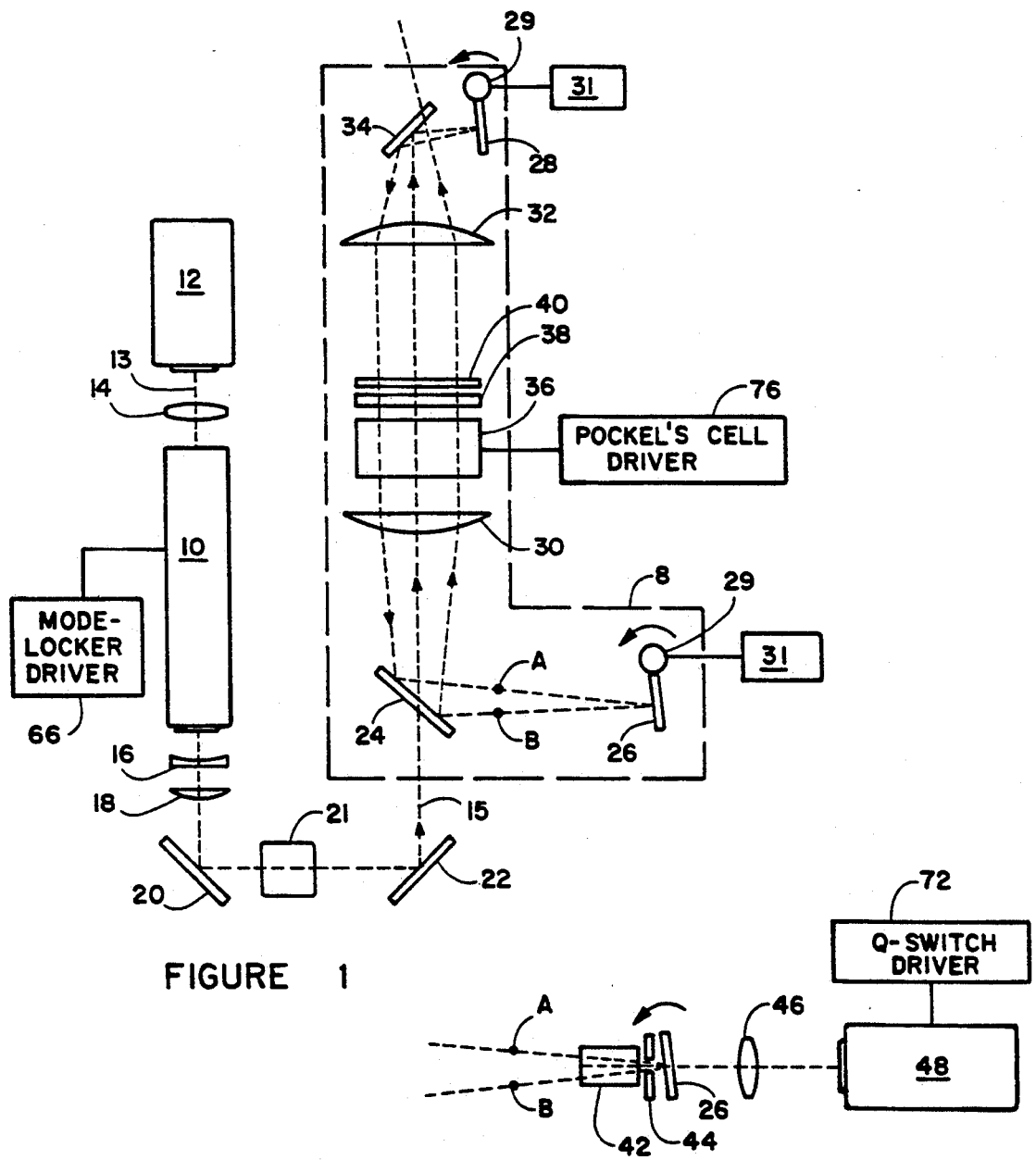
FIG. 1 is a schematic diagram of the integrated scanner-amplifier unit, consisting of a series of intra-cavity optical elements.

A laser pulse train from a mode-locked Ti doped $Al_2O_3$ laser 10 in FIG. 1 is to be used as a seeder to the amplifier scanner system. The laser pulse frequency of the mode-locked laser, as is well known in the art, can be controlled by the round trip time of the laser pulse inside the mode-locked laser and it is at twice of the driver frequency of the electrical signal applied to the mode locker crystal. The frequency is chosen such that time period between adjacent pulses bears a preferred relationship with the arrangements of the optical elements inside the scanner-amplifier system. In the case of Ti doped $Al_2O_3$, a continuous wave laser 12 having a beam 13 such as, but not limited to, an argon gas laser operating at 514.5 nm or a frequency doubled YAG or YLF lasers at 532 nm and 527 nm respectively, can be used as the pump source. The pump laser beam 13 is focused into the mode-locked laser medium with a convergent lens as designed by 14. The arrangement of a laser-pumped mode-locked laser is well known in the art and a commercial model is available from Spectra physics, Fountain View, Calif.

The mode-locked laser beam 15 passes through a set of beam conditioning optics, 16 and 18. In FIG. 1, the beam cross section is expanded by a negative (concave) lens 16 and a positive (convex) lens 18 with their focuses coinciding to form a expansion telescope. The expansion ratio can vary between 2 to 10 by choosing the appropriate focal lengths of the elements 16 and 18 and is determined by the mode-matching requirement between the seed beam 15 and the spatial mode of the amplifier cavity. By centering the lenses along the laser beam minimum beam distortion and good beam collimation can be achieved as the seed beam 15 exits the optical element 18.

The seed beam is directed by high reflective mirrors 20 and 22 into the amplifier cavity. The beam first enters the cavity through a dielectric coated mirror 24 which has the optical characteristics that a pi-polarized laser beam (with the electric field vector horizontal to the plane of incidence) has over 96% transmission, a pi-polarized laser beam (with the electric field vector vertical to the plane of incidence) has over 99% reflectability. Such thin-film polarizer elements are supplied by Burleigh NorthWest, Fishers, New York. The scanner-amplifier cavity 8 is confined between the scanner mirrors 26 and 28, both of which are highly reflective mirrors. The scanner mirrors are each mounted on a gimbal mount 29 with 90 degree tilts in both the horizontal and the vertical (x-y) directions. The design of the gimbal mount can be illustrated as a mirror mount model number MM-1 manufactured and supplied by the Newport Corporation, Fountain Valley, Calif., with appropriate modifications to shorten the pivot point distance and an increase in the spring force. The x-y tilts are achieved by piezo-electric actuators 31 with material such as PZT which can have a linear travel of 40 microns of full scan range at about 1000 Hertz, and at higher frequencies with smaller travel range. Such piezo-actuators are supplied by a number of suppliers, including Burleigh Instruments, Fishers, N.Y.. The scan mirrors 26 and 28 are driven in the same direction at the same angular degree either independently or in tandem in both the x and y directions.

The operating characteristics of the piezo actuators may have small variations. The overall scan angles of the laser beam as emerged from the scanner-amplifier is to be calibrated against the voltage applied to the piezo actuators 31, taking into the account of the small amount of the hysteresis from the piezo electric effect.

A pair of concave lenses 30 and 32 are included inside the scanner-amplifier cavity. The focal lengths of the lenses 30 and 32 are such that the focal length of lens 30 is chosen to be as large as possible, yet the size of scanner-amplifier is to be practical and convenient for use, and the focal length of lens 32 will be as short as possible, yet not so short as to cause optical break down at its focal point. The relative locations of the lenses 30, 32 and end mirrors 26 and 28 are such that the mirror 26 and 28 are to be at the focal point of the lenses 30 and 32 respectively, and the separation between the lenses is to be the sum of their focal lengths. Another dielectric coated mirror 34 which has similar characteristics as mirror 24, is used as a turning mirror and also as an exit mirror where the laser beam 15, intensity amplified and scan-angle amplified, emerges from the scanner-amplifier unit 8.

Other control elements inside the cavity include a Pockel's cell 36 which is consisted of a $LiNbO_3$ or other electro-optical crystal such as KDP. Pockel's cells are commercially available are available from several sources, one such source is Medox Electro-optics, of Ann Arbor, Mich. With the application of electric voltage across the electro-optical crystal, a half-wave retardation in the electric field vector of the laser beam can be generated, which turns the linear polarization of a laser beam traversing the crystal, from a horizontal polarization to vertical, and vise versa. A half-wave retardation plate 38, placed next to the Pockel's cell 36 is for adjusting the polarization of the beam before it reaches the mirror 34, so that the beam will either stay inside the cavity or to exit the cavity at mirror 34. A thin etalon 40 with partial reflection coating on both faces at the laser wavelength is for controlling the gain bandwidth of the seed beam 13. By choosing the appropriate finesse of the etalon, the wavelength width of the laser beam is reduced accordingly, compared to the seed beam bandwidth. The pulse duration is lengthened due to the reduced spectral content in the laser pulse. Another method of expanding the pulse duration can be achieved by stretching the pulse spatially with an optical grating, before the pulse is injected into the beam path at location 21 shown in drawing FIG. 1. For shorter pulses, a commercial pulse compressor unit consisting basically of a single-mode fiber and grating pair, can be placed at location 21 instead of just the optical grating. Such a unit is manufactured by Spectra-physics Lasers, Mountain View, Calif. Hence the output laser pulse can be varied from a minimum which is that of the seed pulse, which is about 1 pico second (ps) in the case of $Ti:Al_2O_3$ as the laser medium in the mode-locked laser, to as much as a several hundred ps. Another method for expanding the pulse duration can be achieved by stretching the pulse spatially with an optical grating, not shown, before the pulse is injected into the scanner-amplifier cavity. Such a device can be inserted in the beam path 21 as shown in FIG. 1. For shorter pulses, a commercially available pulse compressor unit consisting basically of a single-mode fiber and a grating pair, can be placed in the beam path 21 as can the grating alone hereinbefore mentioned. The compressor unit can be obtained from Spectra-Physics Lasers, Mountain View, Calif.

Figure 1A:
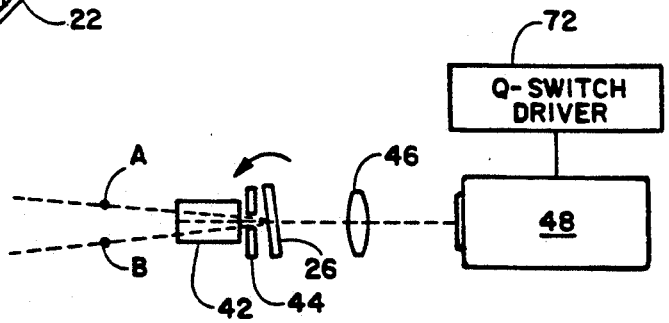
FIG. 1a is a schematic diagram showing a second embodiment of the integrated scanner-amplifier unit of the invention.

Referring now to FIG. 1a, in a second embodiment, a laser gain medium 42, is located near the scanner mirror 26. A aperture cavity aperture 44 which has a fixed or adjustable iris with two translational degrees of freedom for proper centering with the fundamental laser mode location inside the cavity. The laser media is optically pumped by a laser source 48 which will be described hereinafter in more detail. The second embodiment provides enhancement of the laser beam intensity inside the scanner cavity, such that the beam intensity increases by extracting energy stored in the grain medium 42.

OPERATION OF THE PREFERRED EMBODIMENTS

Figure 2A:
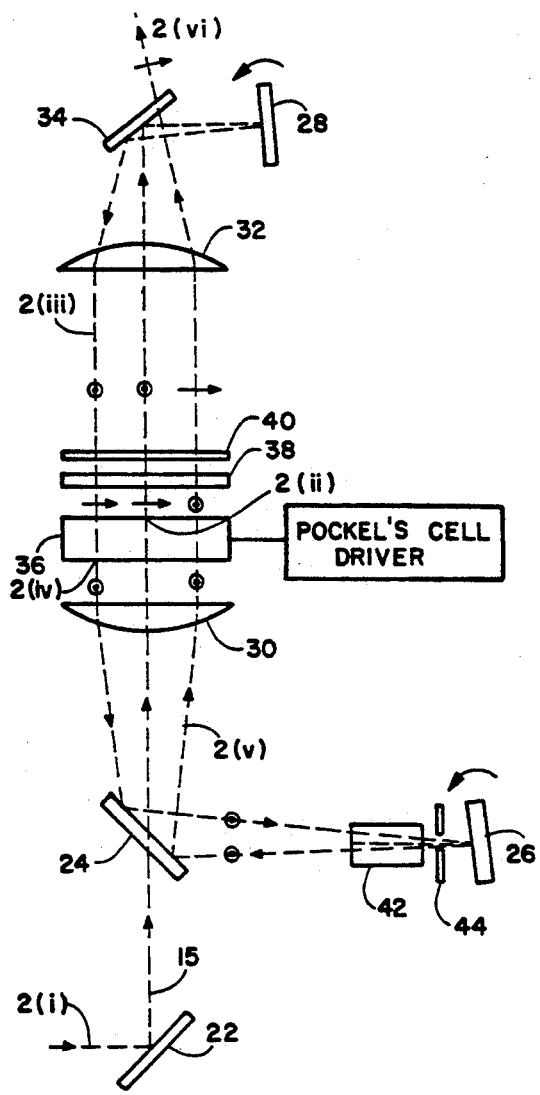
FIG. 2a is a schematic diagram of the intercavity optical elements showing field vectors with Pockel cell voltage application as depicted in drawing FIG. 2b.
Figure 2B:
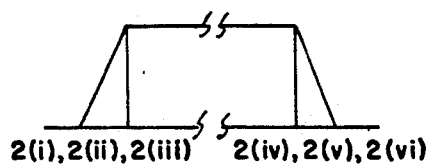

For the purpose of illustration, an angle is being scanned in the horizontal plane (the x-plane). A scan voltage is applied to both piezo actuators 31 for positioning the gimbal mirror mounts for scan mirrors 26 and 28 in the same direction to the same degree, as an example, both pushing the mirrors forward as shown in FIG. 1. A half-wave voltage electrical wave form signal is applied to the Pockel's cell, as illustrated in FIG. 2b. The time sequence from 2(i) to 2(vi) marks the time development of the optical retardation of the Pockel's cell 36. A voltage is to start at time 2(ii), and the optical retardation reaches half-wave at time 2(iii). The voltage is turned off at time 2(iv), and reaches zero retardation at time 2(v). The time duration between 2(ii) and 2(iii) is referred to as the rise time of the Pockel's cell for a half-wave retardation. The duration between 2(iv) and 2(v) is the fall time for the same. Since the seed laser pulse is in the pico second range, the spatial extent of the laser energy is localized in the range of millimeters. The cavity distance between scan mirrors 26 and 28 is, for practical purpose, in the range of tens of centimeters to tens of meters. Therefore, for all practical purpose, the laser pulse can be considered localized and is represented by markers 2(i) to 2(vi) as it travels through the scanner-amplifier cavity. The seed laser beam, at time 2 (i) travels towards the scanner-amplifier cavity, and enters through the thin film polarizer mirror 24. As illustrated in FIG. 2a, the beam 15 has a linear polarization with the electric field vector in the horizontal direction, as indicated by the arrow. The beam passes through the lens 30, and is focused at a point before lens 32 which collimates the beam due to the confocal arrangement of the lenses set 30 and 32. The Pockel's cell (PC) voltage is at the zero level, and the polarization of the seed beam is not changed. The Pockel's cell voltage then turns on at time 2(ii), right after the laser pulse exits the PC crystal. The polarization changes by 90 degrees after passing through the half-wave plate 38, and is now vertical, as indicated by a small circle on the beam path. The beam is then reflected by the thin film polarizer mirror 34 directing the beam towards the scan mirror 28.

Figure 3:
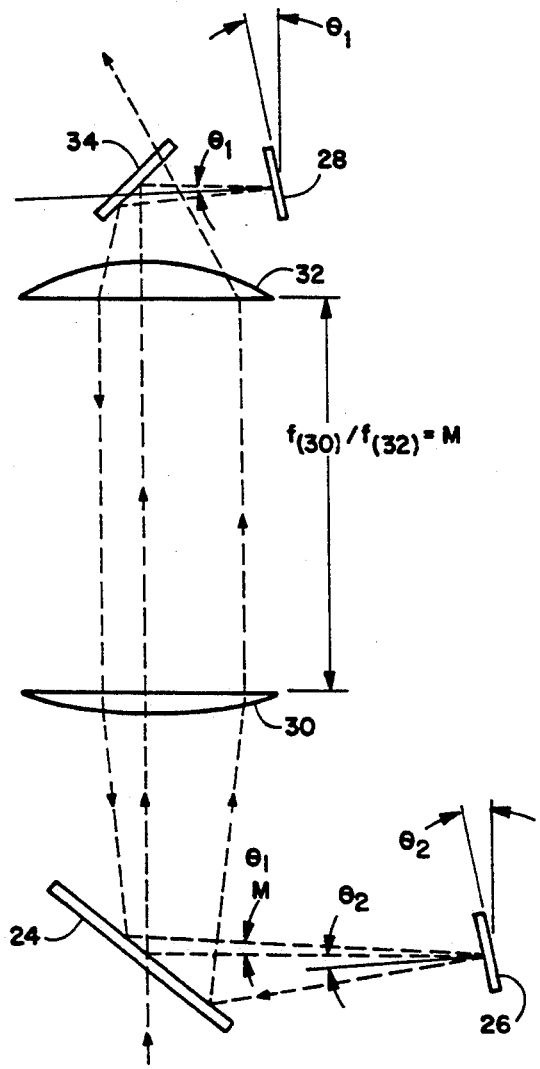
FIG. 3 is a schematic diagram showing the process of angular amplification for the laser beam inside the scanneramplifier cavity.

In FIG. 3, the beam path and the angle of incidence at mirrors 26 and 28 are illustrated. Assume that a voltage $V_1$ is applied to the piezo actuator 31, which induces a scan angle of $\theta_1$ from its zero degree incidence, at which the mirror is at the normal incidence with the incoming seed beam. The reflected beam is at an angle, 2 times $\theta_1$ from the incoming beam. Referring again to drawing FIG. 2(a), the beam is reflected at mirror 28. The vertical polarization of the beam changes by 90 degrees after passing through the half-wave plate 38. The PC voltage reaches half-wave retardation at 2 (iii), see FIG. 2b, before the laser pulse reaches the PC. On passing the PC, the polarization is rotated 90 degrees and is now vertical. The lens 30 recollimates the laser beam 15 and the thin film polarizer 24 is now at high reflection with the vertically polarized beam. The beam 15 then travels towards the laser gain medium 42 and the cavity aperture 44. Assuming that a voltage $V_2$ is applied to the actuator 31 in the mirror gimble mount 29 for the scan mirror 26, and an angle rotation of $\theta_2$ from the normal incidence is resulted in the x-plane, where the normal incidence is defined as the scan mirror angular position for both 26 and 28 at which the seed laser beam 2(i) will retrace its beam path after reflection from both these mirrors. The reflected beam is therefore, at a larger angle than the incident angle before impinging on the mirror 26, by an angle, 2 times $\theta_2$, as shown in FIG. 3. For ease of explanation, the following discussion is directed to ejecting the laser beam after only one reflection from each of the mirrors 26 and 28; However it should be understood that it is contemplated that a plurality of reflections from each mirror within the device prior to the beam exiting therefrom. By so choosing, the PC voltage turn-off starts after the beam emerges from the PC at time 2(iv), and the retardation is zero at 2(v) before the beam reaches the PC on its return trip from the scan mirror 26. The vertical polarization remains vertical after passing the PC, and is rotated to horizontal after the half-wave plate 38. The thin film polarized mirror is now transmissive for the laser beam, and the laser beam emerges from the amplifier-scanner of the invention with a scan angle, resulting from the sum of the effects of the scan angles $\theta_1$ and $\theta_2$ from the scan mirrors 28 and 26 respectively.

It should be understood that invention makes use of the scan mirrors 26 and 28 repeatedly from one or more round trips of the beam inside the cavity to amplify and precisely direct the beam angle before exiting mirror 34.

In our preferred embodiment, the PC voltage turn-off, at times 2(iv)-2(v), is to be applied at the last leg after one or more round trips between the two scan mirrors 26 and 28. In the case where the voltage turn-off is postponed, as in the illustration in FIG. 2(a), the polarization of the reflected beam from mirror 26 is rotated to horizontal after the PC, which is still at its half-wave voltage, and back to be vertical again after the half-wave plate 38. Therefore, the mirror 34 is highly reflective. The beam is trapped inside the cavity, and the beam angle increases with each reflection with either of the scan mirrors.

Further, in addition to changing the beam angle, the optical arrangement enhances the overall scan angle of the beam with a power multiplying enhancement factor.

If the focal length of the lens 30 is longer than that of lens 32, by a factor, M, $$M = f_{(30)}/f_{(32)},$$

where $f_{(30)}$, $f_{(32)}$ are the focal lengths of the lenses 30 and 32 respectively. The angle of incidence on mirror 28 is $\theta_1$, and the angle of incidence on mirror 26 is $$\theta_1/M + \theta_2.$$

Notice the angle reduction of the $\theta_1$ due to the difference in the focal length of the lenses.

On passing through the lenses system from 30 to 32, the reverse, i.e. a magnification of the effective angle, occurs. The incident angle on mirror 28 is now $$(\theta_1/M + \theta_2)*M + \theta_1.$$

In the illustration in FIG. 2(a), in which the laser beam is to exit the cavity after one reflection from mirrors 26 and 28, the output beam would have a scan angle of $2*(\theta_1+M*\theta_2)$.

Notice that the scan angle due to mirror 26, $\theta_2$, is magnified by a factor M.

If a total of N reflections are allowed to occur for each of the two scan mirrors, the final scan angle of the exit beam is $2N*(\theta_1+M*\theta_2)$.

Since each reflection or transmission on an optical surface causes a certain amount of intensity loss and optical distortion in the laser beam, ideally the intended scan angle will be achieved with the smallest number of optical surface contacts. If the scan mirrors have identical gimble mounts 29 and piezo actuators 31, the mirrors can be scanned in tandem, and $\theta_1$ and $\theta_2$ will be substantially equal. The optical loss due to scattering from all the optical elements inside the cavity is reduced by the factor $(M+1)/2$.

For M=3, and 10 round trips inside the cavity, the scan angle is amplified by 20 times more than the amplification of the scan angles from two like but uncoupled piezo mirrors.

It is also clear that all the fore-going discussion about scanning in the horizontal direction, is also applicable to the vertical direction (a Y-scan), by applying the scan voltage to the piezo actuator which controls the vertical tilt of the scan mirror. By applying the appropriate voltages to the actuators controlling the horizontal and the vertical scan directions, the laser beam can be directed to any predetermined location in the two dimensional angular space.

The pump source 48 of the Ti: $Al_2O_3$ in the amplifier cavity in FIG. 1 consists of two major components, namely, a Nd doped YAG or YLF laser which is continuously pumped by arc lamps such as Kr or Ar gas lamp, which is supplied by ILC Technology, Sunnyville, Calif., or by semiconductor diode arrays with the emission laser wavelength to match the absorption band of Nd doped YAG or YLF. Several hundred to over one thousand watts of continuous wave laser output power from Nd: YAG is attainable with multiple lamp-pumped laser heads inside a laser cavity. Such laser is supplied by Lasermetric, Orlando, Florida, and a number of other industrial YAG laser suppliers.

In a preferred embodiment, the Ti ion has an absorption band centered at about 520 nm, with a full width at half maximum of about 100 nm. The second harmonic wavelengths of the Nd doped YAG and YLF are centered around 532 nm and 527 nm respectively, and both are suitable as a pump source.

In the second harmonic generation (SHG) process, one of limiting factor in the conversion efficiency and the power stability is the temperature gradient induced by absorption of the laser at its fundamental and second harmonic frequency. Choosing a second harmonic crystal with good thermal conductivity, and cooling the crystal by liquid flow or by contact cooling are among the common methods to extend the upper limit of the input fundamental laser power to the SHG crystal.

Referring now to drawing FIGS. 4a, 4b and 4c, the output laser beam 55 of a high power, acoustic-optical switched, Nd doped YAG or YLF laser beam source 56 is directed to a series of partially reflecting beam splitters 57, which are coated with dielectric so that, at the 45 degrees incidence, they all have high transmission for the second harmonic wavelength, and each succeeding splitter is a highly reflective at the fundamental wavelength of the laser source 56, so that the laser beam power is to distribute equally among each branch when they are directed towards the SHG crystals 60. The crystal 60 is chosen for high nonlinear coefficient, good acceptance angle, and high tolerance on temperature gradient. KTP, is among the top choice as a SHG crystal for conversion at 1.04 to 1.06 microns.

In a preferred embodiment, 20–60 watts of average power will be achieved in the beams 1–5 of FIG. 4a. To further increase the conversion efficiency, a convex lens 58 can be inserted between each splitter 57 and each SHG crystal 60, such that the crystal is at the focal distance, $f_{(58)}$ from the lens, where the beam cross section is the smallest and the laser power density is the highest. The focal length of the lens is chosen to optimize for the acceptance angle of the SHG crystal. A spherical concave mirror 62 is highly reflective at both the fundamental and the second harmonic wavelength is placed at the radius of curvature of the mirror 62, $R_{(62)}$ from the first surface of the crystal, where the laser beam enters the crystal. This optical arrangement allows for the return beams of both the fundamental and the second harmonic, to retrace the beam path of their first passage in the crystal, and ensure a good beam overlapping in the crystal even there may be walk-off between the beams after their first pass.

To illustrate our embodiment, we combine five beams at the second harmonic wavelength with a novel spatial combiner 64. As shown in FIG. 4(b), the combiner 64 is a six face optical element which has four sides 63a, 63b, 63c and 63d, each of which form a 45 degrees with the base face 67, and a top face 65 which is parallel to its bottom face 67. The side faces are coated for high reflectivity at 45 degrees at the second harmonic wavelength, and the top and bottom faces are coated with antireflection coating at the second harmonic wavelength. As shown in FIG. 4c, by using beam steering optics, the five beam from FIG. 4a can be reflected off the side faces of the combiner 64, and one beam (beam 2) in FIG. 4c can transmit through the parallel faces. The beams are adjusted such that they recollimated and are parallel with each other. A convex lens 66 is centered symmetrically in the beam path, and focuses the five beams into a common focal point. This optical element 66 can be a replacement or an equivalent to the element 46 of FIG. 1.

It also follows from the present invention that additional beams can be combined with a spatial combiner with additional facets on the combiner. As an example, a hexagon instead of a square top, can combine up to 7 beams.

In another embodiment, the facets can be formed on more than one layer, such as 4 facets on the top tier and 6 facets on the second tier.

In all end pumping configurations, the pump beam is absorbed by the laser active ions in the crystal host. The energy distribution in the laser medium is a negative exponential function, with a maximum at the entrant face. For efficient cooling, and to minimize the distortion of the laser beam, the laser medium in the invention is to be in a cylindrical laser rod form. Conventional laser rod is mounted with the end faces outside of the contact with the coolant. In FIG. 5(a), the preferred embodiment consists of a Ti:Al2O3 laser rod with a recessed collar 50. A thin wall tube made of undoped sapphire 52 is to fit at the end sections of the laser rod. The tube piece is glued to the laser rod, and the whole has a cylindrical shape as shown in FIG. 5(b). This cylindrical piece is then mounted to a liquid cooled envelope similar to the ones used in an arc lamp pumped laser. A water flow channel around the laser medium and the extension is shown in FIG. 5(b), in which the water inlets and outlets are shown schematically. O-rings 54 are retained in such a manner that he coolant is sealed from coming into contact with the flat laser surfaces of the laser rods. The tube extension allow the whole laser medium to be in contact with the liquid coolant. Using the same material in the extension tube also minimize stress as a result of difference in thermal expansion coefficient, with temperature variation in the whole assembly.

In another embodiment, an additional pump source can be applied through mirror 24 collinear with laser path from pump source 48, such that the laser media is pumped from both ends.

In another embodiment, additional laser media is to be included in front of the scan mirror 28, and a pump configuration identical to optical elements 46 and 48, pumping one end of the laser medium, or pumping from both ends of the laser medium, is to be applied to the laser medium near mirror 28.

Multi-kilo Hertz laser operation is achieved with the following method. A synchronized electrical wave form is tapped from the mode locker driver 66. According to the desired repetition rate, the synchronized signal can be divided electrically by a timer divider circuit 68, as shown diagrammatically in FIG. 6. The resultant frequency output of the timer-divider determines the laser frequency of the scanner-amplifier system. The output electrical signal of the divider box is then time-delayed through delay generators 70,74, commercially available from Stanford Research Systems, Sunnyville, Calif. One of the delayed signals 71 is fed into the Q-switched driver 72 in the pump laser 48, and a second time-delayed signal 75 is fed into the Pockel's cell driver 76.

The timing of the electrical signals and the laser events are illustrated in FIG. 7 In the top trace (a) of FIG. 7, multi-mega Hz (30-200 MHz) mode locked laser pulses are represented by equally spaced laser spikes at time interval equal to twice the mode locker driver frequency. After the timer-divider circuit, electrical signals at multi-kilo hertz Hz (1,000-50,000) is generated at the output of the timer-divider box, as represented by the trace (b). At a time delay $T_1$, the Q-switch driver for the pump laser is turned on, in trace (c), generating a short pulse of the second harmonic laser pump pulse at a time delay $T_p$, corresponding to the build up of the pump pulse, a characteristic of the pump configuration and the gain factor at the pump laser medium. The second harmonic pump pulse is absorbed in the Ti:Al$_2$O$_3$ laser medium, in trace (d). The Pockel's cell is switched on at a time delay $T_2$ relative to a synchronized timer-divider signal, which is the pulse after the one that triggers the Q-switch driver. the time delay $T_2$ is determined by the actual location of the seed laser pulse from the mode locked laser, as afore mentioned along with the discussion of FIG. 2a. The delay time $T_1$ is to be adjusted so that the peak of the population inversion is to occur when the Pockel's cell crystal reaches the half-wave retardation point of 2(iii) as shown in FIG. 2b.

Other Variations, ramifications and applications of this invention will occur to those skilled in the art upon reading the present disclosure. These are intended to be included within the scope of this invention or defined in the appended claims.

What is claimed is:

1. A laser scanner-amplifier comprising:
    a first source for producing a first laser beam and
    an optical cavity into which said laser beam enters:
    light control means for introducing said laser beam from said source into said cavity and circulating said laser beam inside said cavity and ejecting said laser beam out of said cavity all in predetermined time sequence;
    means for selectively directing said laser beam while circulating inside said cavity; and
    means for the selective control of said laser beam direction as said laser beam exits from said cavity.

2. The invention as defined in claim 1 additionally comprises means for laser beam intensity amplification while circulating.

3. The invention as defined in claim 1 wherein said laser beam emerges from said cavity with said laser beam directed at a selectable angular position in a two dimensional space.

4. The invention as defined in claim 1 wherein said first laser beam consists of laser pulses which have pulse duration ranging from 10 femtoseconds to 10 nanoseconds.

5. The invention as defined in claim 1 wherein said laser beam is from a mode-locked laser.

6. The invention as defined in claim 1 wherein the cross section of said laser beam is variable, and said cross-section is preferably at its substantially the largest allowable dimension.

7. The invention as defined in claim 1 wherein said light control means is a Pockel's cell and at least one fixedly positioned mirror which is coated with metallic or dielectric materials, said at least one is transparent to a first polarization of said laser light beam directed upon, and substantially reflective to a second polarization of said laser light beam directed upon.

8. The invention as defined in claim 7 wherein said first and second polarizations are mutually orthogonal to each other, preferably representing the two elgin states of a linearly polarized light.

9. The invention as defined in claim 1 wherein said means for controlling said laser beam direction comprises:
    a pair of positionable mirrors located within said optical cavity; and
    a pair of convex lenses positioned within said cavity.

10. The invention as defined in claim 9 further comprises a piezo electrical elements wherein said positional mirrors are each mounted on a gimble mount which is connected to a piezo electrical element and are positionable through X and Y axis by means of applying a voltage potential to said piezo electric elements.

11. The invention as defined in claim 10 wherein said positionable mirrors are independently positionable.

12. The invention as defined in claim 10 wherein said positionable mirrors are positioned in tandem in both X and both Y axis.

13. The invention as defined in claim 10 wherein said positionable mirrors are each positionable to substantially the same X, Y coordinates.

14. The invention as defined in claim 1 wherein said means for controlling the direction of said laser beam comprises:
   at least two positionable mirrors and
   at least two convex lenses.

15. The invention as defined in claim 1 wherein further comprising a pair of positionable mirrors, said means for circulating said laser beam inside said cavity comprises a pair of convex lenses, the positions of which are such that the lenses are separate by a distance about the sum of the focal lengths and each of said pair of positionable mirrors is at the focal point one of said lenses, such that said laser beam circulates between said positionable mirrors.

16. The invention as defined in claim-1 additionally comprising a pair of positionable mirrors, said means for circulating said laser beam inside said cavity comprises a pair of convex lenses, the positions of which are such that the lenses are separate by a distance about the sum of the focal lengths, and each of said second pair of positionable mirrors is at the focal point of one of said lenses, such that said laser beam is collimated at said positionable mirrors.

17. The invention as defined in claim 2 wherein said means for the intensity amplification of said laser beam comprises:
   a laser gain medium within said cavity and
   an optical pump source, directing its optical energy at said laser gain medium.

18. The invention as defined in claim 17 wherein the spectral band of the gain region of said laser medium has a substantial overlap with the wavelength of said first laser beam.

19. The invention as defined in claim 17 wherein said optical pump is a continuous wave light source which has a broadband emission spectrum, covering one or more optical pump bands of said laser gain medium.

20. The invention as defined in claim 17 wherein said optical pump source is a repetitively pulsed wave light source which has a broadband emission spectrum, covering one or more optical pump bands of said laser gain medium.

21. The invention as defined in claim 20 wherein said optical pump source is a second laser beam which is directed longitudinally in said laser medium along the direction of said first laser beam, and overlaps substantially said first laser beam.

22. The invention as defined in claim 17 wherein the laser wavelength of said laser medium is tunable over a spectral range.

23. The invention as defined in claim 17 wherein said laser medium consists of one or more elements of transition metal selected from the class including Ti, Cr, Co, V, or Mn as the active lasing element.

24. The invention as defined in claim 17 wherein said laser medium consists of one or more color centers as the active lasing element.

25. The invention as defined in claim 17 wherein said laser medium consists of one or more elements of the rare earths selected from the class including Ce, Pr, Nd, Ho, Tm, Er, or Yb as the active lasing elements.

26. The invention as defined in claim 17 wherein said laser medium consists of combinations of said active lasing elements selected from the class including Ce, Pr, Nd, Ho, Tm, Er, Yb, Ti, Cr, Co, V or Mn as the active lasing elements.

27. The invention as defined in claim 17 wherein said laser medium is a solid state crystal which is preferably an oxide or a fluoride crystal.

28. The invention as defined in claim 9 wherein said pair of convex lenses are of unequal focal length, the positions of said convex lenses are such that the lenses are separate by a distance substantially the sum of the focal lengths, and each of said pair of positionable mirrors is at the focal point of one of said lenses, and the lens with a longer local length is nearer to one of the first said mirror pair, upon which the first said laser beam enters said cavity.

29. The invention as defined in claim 14 wherein said at least two convex lenses are of unequal focal length, the positions of each of said lens inside said optical cavity are such that the lenses are separate by a distance about the sum of the focal lengths and each of said positionable mirrors is at the focal point of one of said lenses, and the lens with the longest local length is nearer to one of the first said mirrors, upon which the said laser beam first enters said cavity.

30. A method of generating a high power laser beam and controlling said laser beam in predetermined angles in two dimensional space which comprises of the steps of:
   producing a first source of a first laser beam;
   injecting said laser beam into a cavity of a control device comprising of means for directional control and amplifying the intensity of said laser beam;
   circulating said laser beam inside said cavity of said control device; and
   exiting said laser beam out of said cavity of said control device when said laser beam attains a predetermined intensity and is at a predetermined angular direction.

31. The method of claim 30 additionally amplifying the intensity and angular direction of said laser beam in said control device.

32. method of generating a high power laser beam and controlling said laser beam in predetermined angles in two dimensional space as recited in claim 30 further comprising the step of selecting part or all of the laser pulses from said first source, such that the laser pulse repetition rate is a fraction of, or the same as, that of said first laser source.

33. A method of generating a high power laser beam and controlling said laser beam in predetermined angles in two dimensional space as recited in claim 30 further comprising the step of synchronization between said injected laser beam, the timing of said control means to recirculate said laser beam, and the timing of said intensity amplification means, such that said injected laser pulse is trapped inside said cavity of said control device, and the intensity of said laser beam is amplified as said laser beam travels each round trip inside said cavity.

34. A method of generating a high power laser beam and controlling said laser beam in predetermined angles in two dimensional space as recited in claim 30 comprising the step of orienting reflective mirrors at a predetermined angular positions in two dimensional space, as provided in said directional control means.

35. A method of generating a high power laser beam and controlling said laser beam in predetermined angles in two dimensional space as recited in claim 30 further comprising the step of controlling the pump power for, and hence the excited state population density of, the lasing elements of a second laser gain medium, as provided in said means for amplifying the intensity of said laser beam.

36. A method of generating a high power laser beam and controlling said laser beam in predetermined angles in two dimensional space as recited in claim 30 further comprising the step of varying the pulse duration of said laser beam exiting said control device by selecting an appropriate pulse duration of said first laser beam, additionally processing said laser beam through means of pulse compression or expansion before injecting said laser beam into said cavity of said control device.

37. The invention as defined in claim 36 wherein said laser beam has pulse duration ranging from 10 femtoseconds to 10 nanoseconds.

38. The method of generating a high power laser beam and controlling said laser beam in predetermined angles in two dimensional space as recited in claim 35 wherein the step of varying the pulse duration of said laser beam exiting said control device comprises processing said laser beam through a pulse compressing or stretching device.

39. A laser scanner-amplifier comprising:
a first source for producing a first laser beam;
a first pair of fixedly positioned opposing dielectric mirrors, at least one of which is transparent and substantially non-reflective to a first polarization of said first laser light beam directed thereon;
a laser light beam polarization means positioned between said first pair of mirrors, said laser light beam passing through said polarization means changes directional beam polarization from a first polarization direction to a second polarization direction, said first pair of mirrors become reflective to said second polarization of said laser beam; and
a second pair of positionable mirrors;
said laser beam is reflected and travels back and forth between said first and second pairs of mirrors through said polarization means a selected number of times prior to changing the polarization of said laser beam by said polarization means from said second polarization direction to said first polarization direction, said laser beam exits said laser scanner-amplifier at a selected exit angle, said exit angle dependent upon the various different angular positioning of said second pair of mirrors during the back and forth travel of said laser beam between said pairs of mirrors.

40. The invention as defined in claim 39 comprising a second source for producing a second laser beam, said second laser beam is at said first polarization direction passes through a selected one of said second pair of positional mirrors and increases the level of power of said first laser beam each time said first laser beam strikes a said selected one of said second pair of positionable mirrors whereby the power of said laser beam exiting said laser scanner-amplifier is increased each time it travels back and forth between said pairs of mirrors.

41. The invention as defined in claim 39 wherein said first source of producing a laser beam is a mode locked laser.

42. The invention as defined in claim 39 wherein said polarization means is a Pockel's cell.

43. The invention as defined in claim 39 wherein each of said positionable mirrors are mounted on a gimble mount positionable through X and Y axis by means of a piezo electric element.

44. The invention as defined in claim 43 wherein said positionable mirrors are independently positional.

45. The invention as defined in claim 43 wherein said positionable mirrors are positioned in tandem.

46. The invention as defined in claim 43 wherein said positional mirrors are positioned to substantially the same X, Y coordinates.

* * * * *